(12) United States Patent
Gough et al.

(10) Patent No.: US 11,365,932 B2
(45) Date of Patent: Jun. 21, 2022

(54) TRANSPORT REFRIGERATION SYSTEM AND METHOD OF OPERATION

(71) Applicant: Carrier Corporation, Jupiter, FL (US)

(72) Inventors: Jason A. Gough, Marcellus, NY (US); Travis William Corley, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 524 days.

(21) Appl. No.: 16/317,723

(22) PCT Filed: Jul. 11, 2017

(86) PCT No.: PCT/US2017/041503
§ 371 (c)(1),
(2) Date: Jan. 14, 2019

(87) PCT Pub. No.: WO2018/013545
PCT Pub. Date: Jan. 18, 2018

(65) Prior Publication Data
US 2019/0263218 A1    Aug. 29, 2019

Related U.S. Application Data

(60) Provisional application No. 62/362,371, filed on Jul. 14, 2016.

(51) Int. Cl.
*F25D 29/00* (2006.01)
*B60H 1/00* (2006.01)
(Continued)

(52) U.S. Cl.
CPC ....... *F25D 29/003* (2013.01); *B60H 1/00014* (2013.01); *B60H 1/00364* (2013.01);
(Continued)

(58) Field of Classification Search
CPC ............... F25D 29/003; F25D 2400/28; F25D 2400/361; B60H 1/00014; B60H 1/00364;
(Continued)

(56) References Cited

U.S. PATENT DOCUMENTS 4,467,615 A * 8/1984 Potjes ..................... F25B 27/00
123/179.6
4,712,383 A * 12/1987 Howland ............. B60H 1/3232
62/200
(Continued)

FOREIGN PATENT DOCUMENTS

CN   102997609 A   3/2013
CN   104912783 A   9/2015
(Continued)

OTHER PUBLICATIONS

Chinese Office Action for Application No. 201780043601.2; dated Aug. 4, 2020; 7 Pages.
(Continued)

*Primary Examiner* — Miguel A Diaz
(74) *Attorney, Agent, or Firm* — Cantor Colburn LLP

(57) ABSTRACT

A transport refrigeration unit system (26) for cooling a trailer compartment (24) is provided. The transport refrigeration unit system (26) includes an engine for controlling a cooling rate capacity, the engine operable at a nominal high speed and a nominal low speed. Also included is a controller (50) in operative communication with the engine to control an engine speed of the engine. Further included is a user interface (52) in operative communication with the controller (50), the user interface (52) providing a high capacity cooling mode to a user, wherein initiation of the high capacity cooling mode includes the engine operating at a speed greater than the nominal high speed to result in a high capacity cooling rate.

12 Claims, 3 Drawing Sheets

(51) Int. Cl.
*B60H 1/32* (2006.01)
*F25B 27/00* (2006.01)

(52) U.S. Cl.
CPC ....... *B60H 1/00735* (2013.01); *B60H 1/3232* (2013.01); *F25B 27/00* (2013.01); *B60H 1/3219* (2013.01); *B60H 2001/3238* (2013.01); *B60H 2001/3272* (2013.01); *F25B 2327/001* (2013.01); *F25B 2600/0253* (2013.01); *F25D 2400/28* (2013.01); *F25D 2400/361* (2013.01)

(58) Field of Classification Search
CPC ............ B60H 1/00735; B60H 1/3232; B60H 1/3219; B60H 2001/3238; B60H 2001/3272; F25B 27/00; F25B 2327/001; F25B 2600/0253
See application file for complete search history.

(56) References Cited

U.S. PATENT DOCUMENTS

| | | | | |
|---|---|---|---|---|
| 4,878,360 | A * | 11/1989 | Viegas | B60H 1/3226 62/239 |
| 4,899,549 | A * | 2/1990 | Berge | F25B 41/20 62/160 |
| 4,903,498 | A * | 2/1990 | Hanson | F25D 29/003 62/126 |
| 4,903,502 | A * | 2/1990 | Hanson | F25B 49/02 236/1 EA |
| 5,123,252 | A * | 6/1992 | Hanson | B60H 1/3225 165/256 |
| 5,161,384 | A * | 11/1992 | Hanson | B60H 1/00978 340/585 |
| 5,168,713 | A * | 12/1992 | Howland | B60H 1/00007 62/117 |
| 5,172,560 | A * | 12/1992 | Jurewicz | F25D 29/003 62/89 |
| 5,172,561 | A * | 12/1992 | Hanson | B60H 1/3225 62/127 |
| 5,291,745 | A * | 3/1994 | Hanson | F24F 1/02 62/89 |
| 5,410,889 | A * | 5/1995 | Sjoholm | F25B 5/00 62/160 |
| 5,557,938 | A * | 9/1996 | Hanson | B60H 1/3208 62/126 |
| 5,629,568 | A * | 5/1997 | Mertens | F25B 49/025 290/40 R |
| 5,644,924 | A | 7/1997 | Carr et al. | |
| 5,732,676 | A | 5/1998 | Weisman et al. | |
| 5,899,084 | A | 5/1999 | Granaszek | |
| 5,983,655 | A | 11/1999 | Kistner et al. | |
| 6,044,651 | A | 4/2000 | Reason et al. | |
| 6,829,523 | B2 | 12/2004 | Hanson | |
| 7,027,912 | B1 | 4/2006 | Metzger | |
| 7,037,234 | B2 | 5/2006 | Kahlon et al. | |
| 7,347,175 | B2 | 3/2008 | Lupo et al. | |
| 7,562,535 | B2 | 7/2009 | Deiml et al. | |
| 7,743,616 | B2 * | 6/2010 | Renken | H02P 9/04 62/134 |
| 7,878,013 | B2 | 2/2011 | Matsuno et al. | |
| 7,890,243 | B2 | 2/2011 | Abendroth | |
| 8,175,791 | B2 | 5/2012 | Lecole et al. | |
| 8,240,162 | B2 | 8/2012 | Taras et al. | |
| 8,256,399 | B2 | 9/2012 | Gamache et al. | |
| 8,874,351 | B2 * | 10/2014 | Jiang | F02D 13/0215 701/103 |
| 8,972,157 | B2 | 3/2015 | Wakon et al. | |
| 9,140,489 | B2 * | 9/2015 | Duraisamy | F25D 29/003 |
| 9,163,603 | B2 | 10/2015 | Wakou et al. | |
| 9,181,916 | B2 | 11/2015 | Wijaya et al. | |
| 9,358,859 | B2 | 6/2016 | Taras et al. | |
| 9,463,681 | B2 | 10/2016 | Olaleye et al. | |
| 9,464,839 | B2 * | 10/2016 | Rusignuolo | F25D 11/003 |
| 9,499,027 | B2 | 11/2016 | Steele et al. | |
| 9,745,908 | B2 * | 8/2017 | Lucht | F02D 29/06 |
| 9,758,013 | B2 * | 9/2017 | Steele | B60H 1/00428 |
| 9,995,210 | B2 * | 6/2018 | Burnham | F02D 31/001 |
| 10,625,561 | B2 * | 4/2020 | Neu | F25D 11/022 |
| 10,703,174 | B2 * | 7/2020 | Dykes | B60H 1/3222 |
| 2001/0017487 | A1 * | 8/2001 | Melin | B60H 1/00964 307/116 |
| 2003/0019224 | A1 * | 1/2003 | Vander Woude | F25D 29/001 62/186 |
| 2005/0132736 | A1 * | 6/2005 | Grimm | B60H 1/00492 62/230 |
| 2008/0087029 | A1 * | 4/2008 | Renken | B60H 1/3226 62/134 |
| 2010/0107661 | A1 * | 5/2010 | Awwad | F25D 29/003 62/80 |
| 2010/0263393 | A1 * | 10/2010 | Chen | F25B 49/022 62/115 |
| 2011/0000244 | A1 * | 1/2011 | Reason | B60L 1/02 62/323.3 |
| 2011/0041533 | A1 * | 2/2011 | Foye | F25B 49/025 62/228.1 |
| 2012/0055175 | A1 * | 3/2012 | Ting | B60H 1/3222 62/61 |
| 2012/0090337 | A1 * | 4/2012 | Chen | F25B 30/02 62/79 |
| 2012/0111044 | A1 | 5/2012 | Chen et al. | |
| 2012/0253636 | A1 * | 10/2012 | Jiang | F02D 41/2438 701/102 |
| 2013/0014527 | A1 | 1/2013 | Lukasse et al. | |
| 2013/0283826 | A1 * | 10/2013 | Burnham | F25B 49/025 62/56 |
| 2013/0289847 | A1 * | 10/2013 | Olaleye | F02D 41/266 701/102 |
| 2013/0327285 | A1 * | 12/2013 | Burnham | B60H 1/00428 123/2 |
| 2014/0020414 | A1 * | 1/2014 | Rusignuolo | F25B 27/00 62/115 |
| 2014/0144164 | A1 * | 5/2014 | Steele | B60H 1/3222 62/115 |
| 2014/0345301 | A1 * | 11/2014 | Steele | B60P 3/20 62/61 |
| 2015/0000636 | A1 | 1/2015 | Stockbridge et al. | |
| 2015/0007552 | A1 | 1/2015 | Steele et al. | |
| 2015/0135737 | A1 | 5/2015 | Cresswell et al. | |
| 2015/0183297 | A1 * | 7/2015 | Okada | B60H 1/3211 62/323.1 |
| 2015/0253058 | A1 | 9/2015 | Casasanta | |
| 2015/0314670 | A1 | 11/2015 | Lucht et al. | |
| 2015/0314671 | A1 * | 11/2015 | Rajtmajer | B60H 1/3232 62/99 |
| 2015/0321539 | A1 * | 11/2015 | Mohs | F25D 29/003 62/115 |
| 2015/0330321 | A1 * | 11/2015 | Lucht | B60H 1/3222 701/104 |
| 2015/0330703 | A1 * | 11/2015 | Satou | G05B 15/02 700/300 |
| 2015/0377536 | A1 * | 12/2015 | West | F04C 28/08 62/115 |
| 2016/0061504 | A1 * | 3/2016 | Penn, II | F25B 47/025 62/80 |
| 2017/0057323 | A1 | 3/2017 | Neu et al. | |
| 2017/0136844 | A1 * | 5/2017 | Neu | B60H 1/00014 |
| 2017/0151859 | A1 * | 6/2017 | Dykes | B60H 1/00014 |
| 2017/0203632 | A1 * | 7/2017 | Westendarp | B60H 1/00521 |
| 2017/0203633 | A1 | 7/2017 | High et al. | |
| 2018/0001742 | A1 * | 1/2018 | Vehr | F25B 47/006 |
| 2018/0043753 | A1 * | 2/2018 | Jung | B60H 1/3208 |
| 2018/0222278 | A1 * | 8/2018 | Mizuma | B60H 1/00428 |
| 2020/0369119 | A1 * | 11/2020 | Son | B60H 1/3223 |
| 2021/0031593 | A1 * | 2/2021 | Kennedy | F02D 41/021 |

FOREIGN PATENT DOCUMENTS

| | | |
|---|---|---|
| DE | 10211461 C1 | 7/2003 |
| DE | 102008020181 A1 | 11/2009 |
| EP | 1790921 A1 | 5/2007 |
| EP | 2423623 A1 | 2/2012 |

(56) References Cited

FOREIGN PATENT DOCUMENTS

| WO | 8600690 A1 | 1/1986 | |
|---|---|---|---|
| WO | 2012047499 A2 | 4/2012 | |
| WO | WO-2014106068 A1 * | 7/2014 | ......... B60H 1/00764 |

OTHER PUBLICATIONS

International Search Report and Written Opinion regarding PCT/US2017/041503; dated Oct. 10, 2017; 14 pgs.

* cited by examiner

TRANSPORT REFRIGERATION SYSTEM AND METHOD OF OPERATION

CROSS-REFERENCE TO RELATED APPLICATIONS

This application is based on International Application No. PCT/US2017/041503 filed on Jul. 11, 2017, which claims priority to U.S. Provisional Patent Application Ser. No. 62/362,371, filed on Jul. 14, 2016, both of which are incorporated herein by reference in their entireties.

BACKGROUND OF THE DISCLOSURE

The embodiments herein generally relate to transport refrigeration units and, more particularly, to various cooling modes for such systems, as well as a method of operating such systems.

Transport refrigeration unit (TRU) systems are employed to cool one or more compartments within a trailer. The compartment(s) is used to contain perishable products that are to be maintained at or proximate a desired temperature during storage and/or transportation of the trailer.

TRU systems include a controller that assists in regulating the cooling mode that the TRU operates in. In particular, the controller communicates with an engine to control the engine speed, which controls the cooling rate capacity of the system. A typical TRU system includes an engine that operates at a single speed or, in some cases, a nominal high speed and a nominal low speed. The cooling rate capacity is limited by the nominal high speed and is configured to cool the refrigeration compartment at a rate governed by the nominal high speed, regardless of whether the TRU system is in a transport mode that operates under a temperature control band or if the refrigeration compartment is being pulled down to a set point from an ambient temperature in preparation for loading. This limitation can lead to lengthy wait times before loading is permitted and potentially jeopardizes the perishable product if a loader becomes impatient and loads the product prior to the refrigeration compartment reaching the set point.

The above-noted nominal low speed can be higher than necessary when maintaining the refrigeration compartment at light load conditions. Operation in such a mode undesirably results in less than optimal fuel consumption.

BRIEF DESCRIPTION OF THE DISCLOSURE

According to one embodiment, a transport refrigeration unit system for cooling a trailer compartment is provided. The transport refrigeration unit system includes an engine for controlling a cooling rate capacity, the engine operable at a nominal high speed and a nominal low speed. Also included is a controller in operative communication with the engine to control an engine speed of the engine. Further included is a user interface in operative communication with the controller, the user interface providing a high capacity cooling mode to a user, wherein initiation of the high capacity cooling mode includes the engine operating at a speed greater than the nominal high speed to result in a high capacity cooling rate.

In addition to one or more of the features described above, or as an alternative, further embodiments may include a transport operating mode of the engine that includes operation of the transport refrigeration unit system within a temperature control band while the trailer compartment is moving.

In addition to one or more of the features described above, or as an alternative, further embodiments may include that the high capacity cooling mode is not available during the transport operating mode.

In addition to one or more of the features described above, or as an alternative, further embodiments may include that the high capacity cooling mode provides a single temperature change from a starting temperature to a set point temperature.

In addition to one or more of the features described above, or as an alternative, further embodiments may include that the starting temperature is an ambient temperature.

In addition to one or more of the features described above, or as an alternative, further embodiments may include an efficiency operating mode of the engine, wherein operation in the efficiency operating mode includes the engine operating at a speed less than the nominal low speed.

In addition to one or more of the features described above, or as an alternative, further embodiments may include that the user interface allows a user to initiate the efficiency operating mode.

In addition to one or more of the features described above, or as an alternative, further embodiments may include that the efficiency operating mode is available during operation of the transport refrigeration unit system within a temperature control band.

In addition to one or more of the features described above, or as an alternative, further embodiments may include that the user interface is located within a cab of a tractor operatively coupled to the trailer compartment.

In addition to one or more of the features described above, or as an alternative, further embodiments may include that the user interface is a portable device.

According to another embodiment, a method of operating a transport refrigeration unit system is provided. The method includes controlling a cooling rate capacity of the transport refrigeration unit system with an engine that is operable at a nominal high speed and a nominal low speed. The method also includes controlling an engine speed of the engine with a controller. The method further includes initiating a high capacity cooling mode that includes operating the engine of at a speed greater than the nominal high speed to result in a high capacity cooling rate.

In addition to one or more of the features described above, or as an alternative, further embodiments may include that initiating the high capacity cooling mode is done with a user interface that is in operative communication with the controller.

In addition to one or more of the features described above, or as an alternative, further embodiments may include operating the high capacity cooling mode for a duration of a single temperature change from an ambient temperature to a set point temperature.

In addition to one or more of the features described above, or as an alternative, further embodiments may include operating the engine in an efficiency operating mode that includes the engine operating at a speed less than the nominal low speed.

In addition to one or more of the features described above, or as an alternative, further embodiments may include that the efficiency operating mode is available during operation of the transport refrigeration unit system within a temperature control band.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
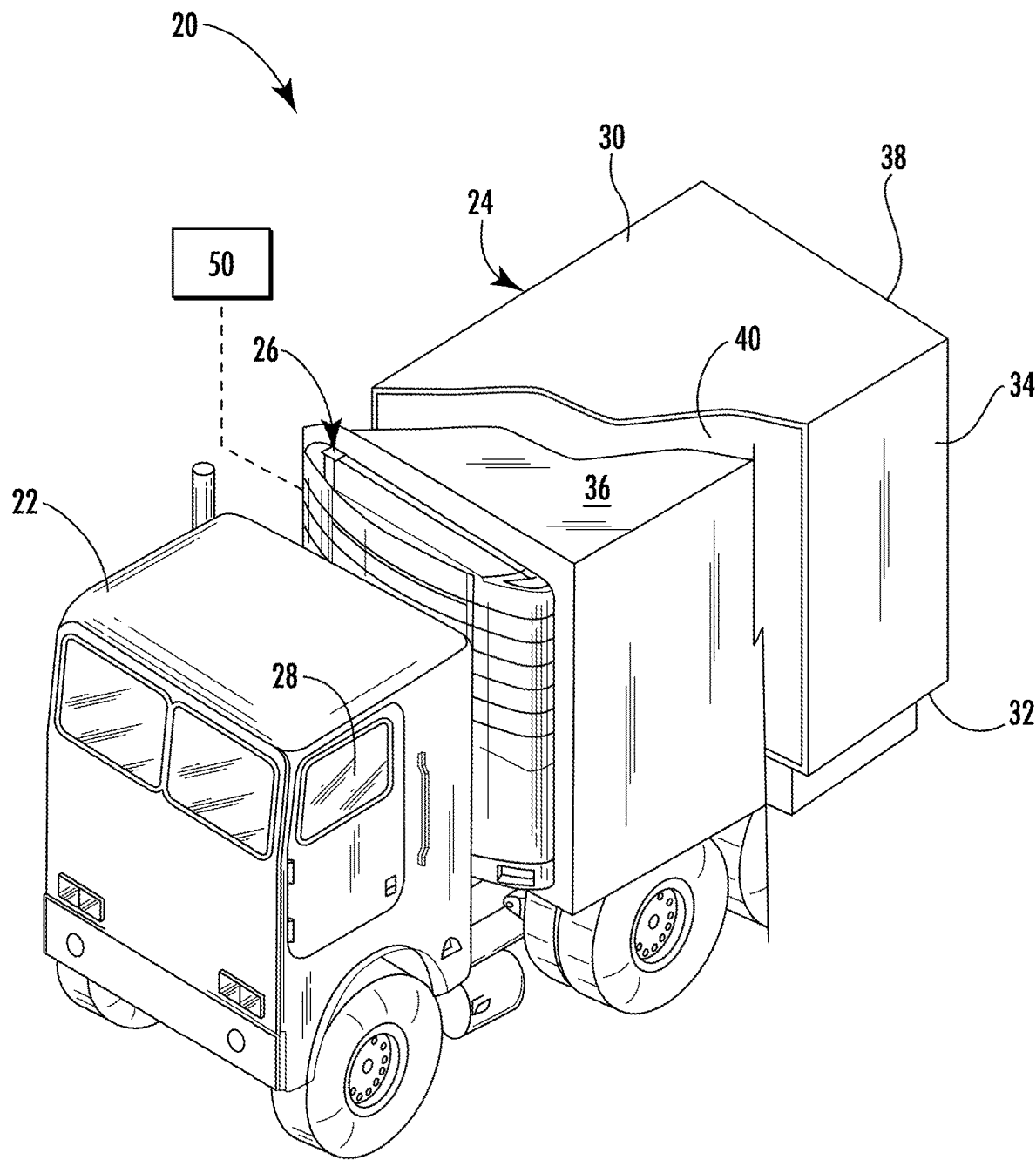
FIG. 1 is a perspective view of a tractor trailer system having a transport refrigeration unit system for cooling a refrigeration compartment of a trailer.

Referring to FIG. 1, a tractor trailer system 20 is illustrated. The tractor trailer system 20 includes a tractor or truck 22, a trailer 24 and a transport refrigeration unit ("TRU") 26. The tractor 22 includes an operator's compartment or cab 28. The trailer 24 is operatively coupled to the tractor 22 and is thus pulled or propelled to desired destinations. The trailer 24 includes a top wall 30, a bottom wall 32 opposed to and spaced from the top wall 30, two side walls 34 spaced from and opposed to each another, and opposing front and rear walls 36, 38. The walls 30, 32, 34, 36, 38 together define boundaries of a cargo compartment 40. It is contemplated and understood that the cargo compartment 40 may also be divided into two or more smaller compartments for different temperature cargo requirements.

The trailer 24 is generally constructed to store cargo (not shown) in the compartment 40. The TRU 26 is generally integrated into the trailer 24 and is mounted to the front wall 36 in some embodiments, such as the illustrated embodiment. The cargo is maintained at a desired temperature by cooling of the compartment 40 via the TRU 26 that circulates air into and through the cargo compartment 40 of the trailer 24. It is further contemplated and understood that the TRU 26 may be applied to any transport container and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

The TRU 26 may be an all-electric TRU 26, and includes several components that facilitate the desired cooling operation of the compartment 40. Such components may include, but are not limited to, a compressor, an electric compressor motor, a condenser heat exchanger that may be air cooled, a condenser fan assembly, a receiver, a filter dryer, a heat exchanger, a thermostatic expansion valve, an evaporator heat exchanger, an evaporator fan assembly, a suction modulation valve, and a controller 50 that may include a computer-based processor (e.g., microprocessor).

The controller 50 is in operative communication with the engine of the TRU 26 to control an engine speed of the engine. The engine speed dictates the cooling rate capacity of the TRU 26. To accommodate different conditions and cargo requirements, the TRU 26 is configured to operate at a first cooling rate capacity while the engine is operated at a nominal high speed and at a second cooling rate capacity while the engine is operated at a nominal low speed, with the first cooling rate capacity being greater than the second cooling rate capacity. Therefore, TRU 26 cools the compartment 40 at a faster rate when operating at the nominal high speed of the engine. Although a faster cooling rate is typically desirable, such an operating condition comes at the expense of fuel efficiency. Additional operating conditions of the TRU 26 that address the cooling rate-fuel efficiency tradeoff, as well as other issues, are described herein. In particular, the TRU 26 offers a faster cooling rate (referred to herein as a "high capacity cooling mode"), relative to the above-described engine speed operating conditions, is available for rapid, temporary cooling and a lower cooling rate (referred to herein as an "efficiency operating mode"), relative to the above-described operating conditions.

Figure 2:
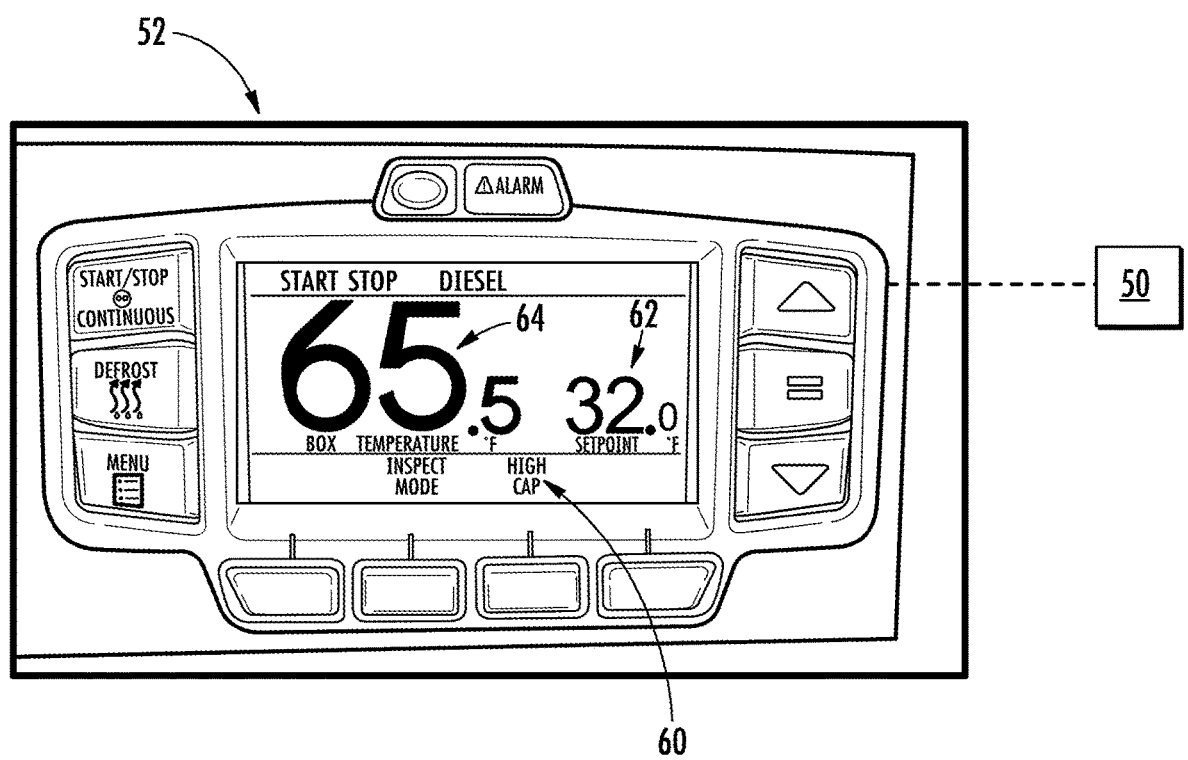
FIG. 2 is an elevational view of a user interface illustrating a first operating mode of the transport refrigeration unit system.

Referring now to FIG. 2, a user interface 52 is in operative communication with the controller 50. In some embodiments, the user interface 52 is fixedly located within the cab 28 of the tractor 22, thereby making the user interface 52 accessible to a driver or passenger of the cab 28. In such embodiments, the user interface 52 is in wired or wireless communication with the controller 50. Alternatively, the user interface 52 is, or is part of, a portable device that is in wireless communication with the controller 50.

The user interface 52 includes a menu option that allows an operator to initiate the high capacity cooling mode 60. The high capacity cooling mode 60 is utilized when a single temperature change (may be referred to as a single "pull down") to a set point temperature 62 is desired. For example, a single pull down from a cargo compartment temperature 64 to the set point temperature 62 may be performed with the high capacity cooling mode 60. Such a temperature change is particularly desirable when cooling a "warm" compartment (e.g., ambient) in preparation for loading of the compartment 40 with cargo. As described above, the cooling rate is determined by the operating engine speed of the TRU 26, however, the nominal high speed and the nominal low speed are intended to operate within a temperature control band which is an acceptable temperature range proximate the set point temperature. While the nominal high speed may be used to perform the single pull down, the high capacity cooling mode 60 provides a temporary cooling rate that is faster than that carried out during the nominal high speed by operating at a greater engine speed.

As described above, it is contemplated that the high capacity cooling mode 60 is only used for a single pull down. In some embodiments, the high capacity cooling mode 60 is only employed when the TRU 26 is not in a "transport operating mode" of the engine. The transport operating mode of the engine includes operation of the TRU 26 within a temperature control band and/or while the compartment 40 is moving. As one can appreciate, the high capacity cooling mode 60 is distinguishable from a more long-term and steady state operating condition, such as the above-described transport operating mode.

The high capacity cooling mode 60 may be initiated with the user interface 52 via a button, touch screen or the like. In operation, a user may initiate the high capacity cooling mode 60 in preparation for loading the compartment 40 with cargo. The set point temperature 62 is set and the compartment 40 is cooled at a rapid rate until the set point temperature 62 is obtained. Subsequently, the compartment 40 may be loaded with the cargo. In some embodiments, the controller automatically de-activates the high capacity cooling mode 60 upon reaching the set point temperature 62 and switches to one of the other operating conditions described herein for operation within a temperature control band. Alternatively, a user may be required to manually de-activate the high capacity cooling mode 60.

Figure 3:
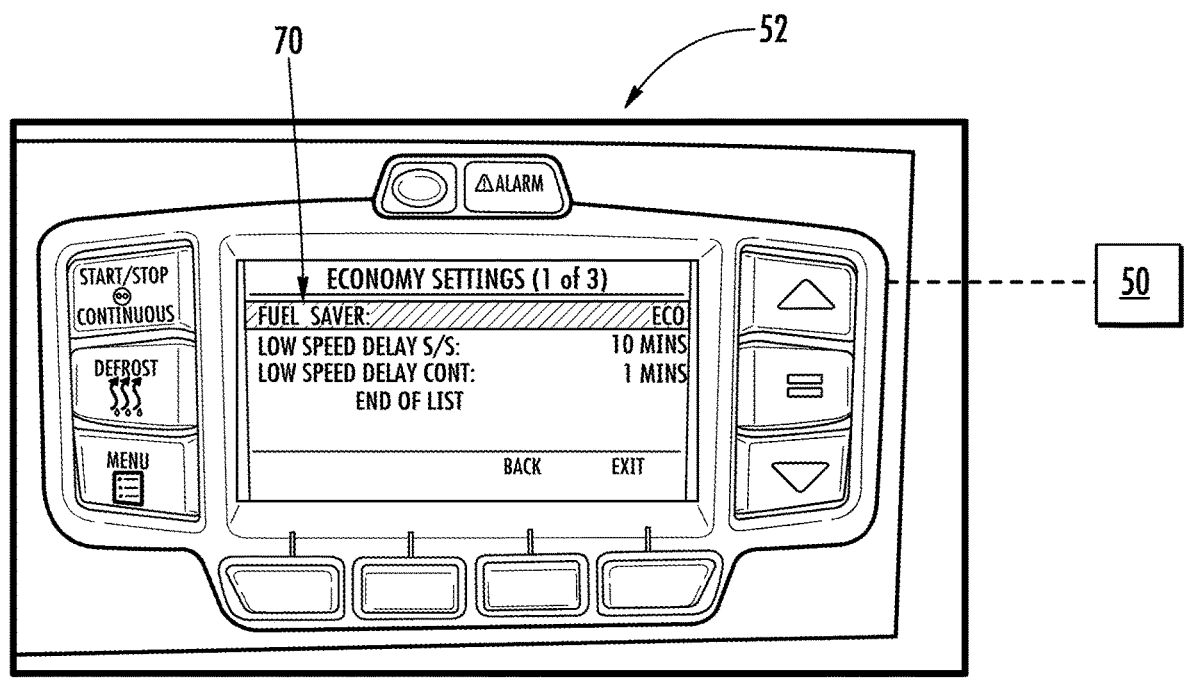
FIG. 3 is an elevational view of the user interface illustrating a second operating mode of the transport refrigeration unit system.

Referring now to FIG. 3, the TRU 26 also provides an efficiency operating mode 70 that is achieved when the engine operates at a speed lower than the nominal low speed.

The efficiency operating mode 70 operates proximate the set point temperature 64 within a temperature control band to improve fuel economy when there is a low cooling capacity requirement from the TRU 26. A low cooling capacity requirement may be present when a more flexible temperature control band is permissible, when compared to the temperature control band associated with the nominal low speed of the engine. This is based on the cargo requirements.

In some embodiments, the efficiency operating mode 70 is a functional parameter programmed into the controller 50 and is automatically initiated in some systems. In other embodiments, the user interface 52 allows a user to manually control when the efficiency operating mode 70 is activated and de-activated. As described above, the user may affect such control with a button, touch screen or the like of the user interface 52.

Advantageously, the TRU 26 system described herein provides more customized cooling modes optionally available to a user. The additional cooling modes substantially improve functionality. In the case of the high capacity cooling mode 60, the user selected mode temporarily increases cooling capacity and allows faster pull down of a warm conditioned space, which reduces the waiting time to load a conditioned trailer and improves protection of the cargo therein. The efficiency operating mode 70 forces the engine to run at a lower speed when the cooling capacity requirement is low in the temperature control band, resulting in substantially improved fuel economy.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration unit system comprising:
    providing a high capacity cooling mode on a user interface;
    controlling a cooling rate capacity of the transport refrigeration unit system with an engine that is operable at a nominal high speed and a nominal low speed;
    controlling an engine speed of the engine with a controller; and
    initiating the high capacity cooling mode through a selection on the user interface, the high capacity cooling mode including operating the engine at a speed greater than the nominal high speed to result in a high capacity cooling rate;
    wherein a transport operating mode of the engine includes operation of the transport refrigeration unit system within a temperature control band while the trailer compartment is moving;
    wherein the high capacity cooling mode is not available during the transport operating mode.

2. The method of claim 1, further comprising operating the high capacity cooling mode for a duration of a single temperature change from an ambient temperature to a set point temperature.

3. The method of claim 1, further comprising operating the engine in an efficiency operating mode that includes the engine operating at a speed less than the nominal low speed.

4. The method of claim 3, wherein the efficiency operating mode is available during operation of the transport refrigeration unit system within a temperature control band.

5. A transport refrigeration unit system for cooling a trailer compartment, the transport refrigeration unit system comprising:
    an engine for controlling a cooling rate capacity, the engine operable at a nominal high speed and a nominal low speed;
    a controller in operative communication with the engine to control an engine speed of the engine; and
    a user interface in operative communication with the controller, the user interface providing a high capacity cooling mode to a user, wherein initiation of the high capacity cooling mode through a selection on the user interface includes the engine operating at a speed greater than the nominal high speed to result in a high capacity cooling rate;
    wherein a transport operating mode of the engine includes operation of the transport refrigeration unit system within a temperature control band while the trailer compartment is moving;
    wherein the high capacity cooling mode is not available during the transport operating mode.

6. The transport refrigeration unit system of claim 5, wherein the user interface is located within a cab of a tractor operatively coupled to the trailer compartment.

7. The transport refrigeration unit system of claim 5, wherein the user interface is a portable device.

8. The transport refrigeration unit system of claim 5, wherein the high capacity cooling mode provides a single temperature change from a starting temperature to a set point temperature.

9. The transport refrigeration unit system of claim 8, wherein the starting temperature is an ambient temperature.

10. The transport refrigeration unit system of claim 5, further comprising an efficiency operating mode of the engine, wherein operation in the efficiency operating mode includes the engine operating at a speed less than the nominal low speed.

11. The transport refrigeration unit system of claim 10, wherein the user interface allows a user to initiate the efficiency operating mode.

12. The transport refrigeration unit system of claim 10, wherein the efficiency operating mode is available during operation of the transport refrigeration unit system within a temperature control band.

* * * * *